(12) United States Patent
Mochizuki et al.

(10) Patent No.: US 7,990,653 B2
(45) Date of Patent: Aug. 2, 2011

(54) PERPENDICULAR RECORDING MAGNETIC HEAD WITH A MAIN MAGNETIC POLE PIECE AND AN AUXILIARY MAGNETIC POLE PIECE

(75) Inventors: Masafumi Mochizuki, Kanagawa-ken (JP); Shuji Nishida, Kanagawa (JP); Kimitoshi Etoh, Kanagawa (JP); Isao Nunokawa, Kanagawa (JP)

(73) Assignee: Hitachi Global Storage Technologies Netherland BV, Amsterdam (NL)

( * ) Notice: Subject to any disclaimer, the term of this patent is extended or adjusted under 35 U.S.C. 154(b) by 1131 days.

(21) Appl. No.: 11/796,196

(22) Filed: Apr. 27, 2007

(65) Prior Publication Data
US 2007/0253107 A1    Nov. 1, 2007

(30) Foreign Application Priority Data
Apr. 27, 2006    (JP) ................. 2006-123442

(51) Int. Cl.
G11B 5/127    (2006.01)
(52) U.S. Cl. .............. 360/125.09; 360/125.3; 360/125.1
(58) Field of Classification Search .......... 360/125.09–125.11, 125.13–125.15, 360/125.3
See application file for complete search history.

(56) References Cited

U.S. PATENT DOCUMENTS

| | | | |
|---|---|---|---|
| 6,683,759 B1 * | 1/2004 | Chang et al. ................. 360/317 |
| 6,741,421 B2 * | 5/2004 | Mochizuki et al. ...... 360/125.13 |
| 6,775,099 B2 * | 8/2004 | Kuroda et al. ............ 360/125.06 |
| 6,950,277 B1 * | 9/2005 | Nguy et al. .............. 360/125.14 |
| 6,952,325 B2 * | 10/2005 | Sato et al. ................ 360/125.08 |
| 6,954,340 B2 * | 10/2005 | Shukh et al. ................. 360/317 |
| 7,002,775 B2 * | 2/2006 | Hsu et al. ................. 360/125.03 |
| 7,068,453 B2 * | 6/2006 | Terris et al. ..................... 360/59 |
| 7,245,454 B2 * | 7/2007 | Aoki et al. ................. 360/125.1 |
| 7,295,401 B2 * | 11/2007 | Jayasekara et al. ...... 360/125.08 |
| 7,310,203 B2 * | 12/2007 | Yoshida et al. .......... 360/125.33 |
| 7,426,092 B2 * | 9/2008 | Fukui et al. .............. 360/125.06 |
| 7,535,675 B2 * | 5/2009 | Kimura et al. ........... 360/125.09 |
| 7,586,715 B2 * | 9/2009 | Koyama et al. ............... 360/321 |
| 7,684,149 B2 * | 3/2010 | Mochizuki et al. ......... 360/125.3 |
| 7,715,152 B2 * | 5/2010 | Okada et al. .................. 360/319 |
| 2002/0034043 A1 * | 3/2002 | Okada et al. .................. 360/125 |
| 2002/0080525 A1 * | 6/2002 | Sato et al. ..................... 360/126 |

(Continued)

FOREIGN PATENT DOCUMENTS
JP    2004-127480    4/2004
(Continued)

*Primary Examiner* — Brian E Miller
(74) *Attorney, Agent, or Firm* — Burton IP Law Group; Daphne L. Burton

(57) ABSTRACT

Embodiments in accordance with the present invention provide a perpendicular recording magnetic head whose dimensional dependency on the nonuniformity of magnetic field strength and distribution during manufacture is minimized, with narrowed tracks and without attenuation or erasure of adjacent track data while maintaining high magnetic field strength. According to one embodiment, a magnetic material (trailing/side shield) for creating a steep gradient of magnetic field strength is provided at a trailing side of a pole tip of a main magnetic pole piece and in a direction of the track width. The magnetic head is formed so that a gap (side gap length "gl") between a side shield and a throat height portion of the pole tip progressively decreases with an increasing distance from an air-bearing surface, in a direction of an element height. That is, side gap length "gl" (2) at an element height position P2 is made smaller than side gap length "gl" (1) at an air-bearing surface position P1 so as to satisfy a relationship of gl(1)>gl(2).

7 Claims, 12 Drawing Sheets

U.S. PATENT DOCUMENTS

| | | | |
|---|---|---|---|
| 2004/0156142 A1* | 8/2004 | Mochizuki et al. | 360/125 |
| 2005/0117251 A1* | 6/2005 | Matono et al. | 360/126 |
| 2005/0128637 A1* | 6/2005 | Johnston et al. | 360/125 |
| 2005/0135007 A1* | 6/2005 | Nishikawa et al. | 360/126 |
| 2005/0141137 A1* | 6/2005 | Okada et al. | 360/122 |
| 2005/0280936 A1* | 12/2005 | Sasaki et al. | 360/126 |
| 2006/0002018 A1* | 1/2006 | Fukui et al. | 360/125 |
| 2006/0082924 A1* | 4/2006 | Etoh et al. | 360/125 |
| 2006/0221497 A1* | 10/2006 | Okada et al. | 360/125 |
| 2007/0217069 A1* | 9/2007 | Okada et al. | 360/126 |
| 2007/0253105 A1* | 11/2007 | Yoshida et al. | 360/126 |
| 2008/0068747 A1* | 3/2008 | Sasaki et al. | 360/110 |
| 2008/0112082 A1* | 5/2008 | Guan et al. | 360/128 |

FOREIGN PATENT DOCUMENTS

JP    2005-190518    7/2005

* cited by examiner

Fig. 1 4 A
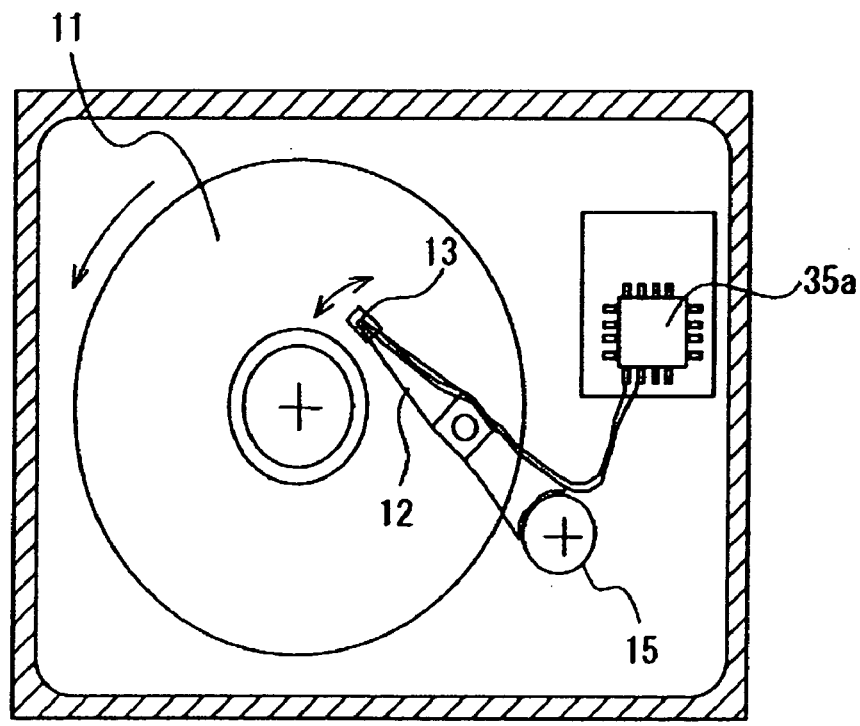
Fig. 1 4 B
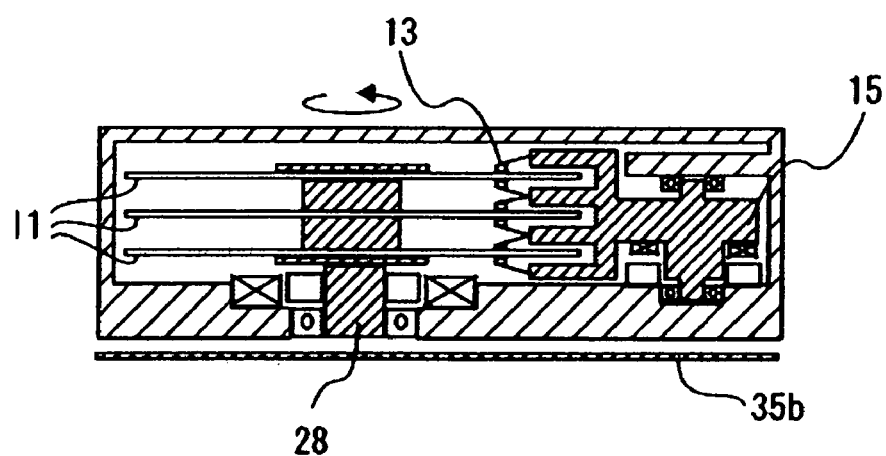

PERPENDICULAR RECORDING MAGNETIC HEAD WITH A MAIN MAGNETIC POLE PIECE AND AN AUXILIARY MAGNETIC POLE PIECE

CROSS-REFERENCE TO RELATED APPLICATION

The instant nonprovisional patent application claims priority to Japanese Application No. 2006-123442 filed Apr. 27, 2006 and incorporated by reference in its entirety herein for all purposes.

BACKGROUND OF THE INVENTION

Magnetic read/write devices have magnetic recording media and magnetic heads, and data is read from/written onto the magnetic recording media by the magnetic heads. Surface-recording density must be increased in order to increase the recording capacity per unit area of each magnetic recording medium. In the modern longitudinal magnetic recording scheme, however, a decrease in the bit length of the written data causes the thermal fluctuation of magnetization of the medium, thus preventing the surface-recording density from being increased. Perpendicular magnetic recording in which a magnetizing signal is recorded in a direction perpendicular to the medium, is a type of recording scheme that can solve the above problem. There are two types of perpendicular magnetic recording schemes. One type uses a two-layer perpendicular medium having a backing soft magnetic layer, and the other type uses a single-layer perpendicular medium not having a backing soft magnetic layer. When the recording medium used is the two-layer perpendicular medium, a stronger magnetic field for recording can be applied to the medium by conducting the above signal-recording process using a so-called single magnetic pole head equipped with the main magnetic pole piece and with an auxiliary magnetic pole piece. In order to generate the magnetic field, the main magnetic pole piece is typically formed to be narrowed down in volume as the magnetic pole piece approaches an air-bearing surface, and to have a constant width in a range of several hundreds of nanometers (nm) or less in the vicinity of the air-bearing surface. The air-bearing surface of the main magnetic pole piece generally has an inverted trapezoidal shape while its width on the leading side is small in consideration of a head skew angle.

In addition to the magnetic field strength of the writing head, the magnetic field gradient in the head magnetic field perpendicular components profile where the boundaries of the write bit cells are recorded, that is, the magnetic field gradient of the head magnetic field perpendicular components profile in the traveling direction of the head, is an important factor for achieving higher recording density. To achieve higher recording density, it is necessary that the magnetic field gradient is increased. Japanese Laid-Open Patent Publication No. 2005-190518 ("Patent Document 1") describes a structure in which a main magnetic pole piece has a trailing side shield at both a trailing side and track side of the magnetic pole piece via a non-magnetic layer in order to improve a recording magnetic field gradient.

Magnetic heads must have the appropriate recording magnetic field strength and distribution according to the particular recording medium. The magnetic field strength and distribution greatly depend on throat height. The throat height is a dimension from the medium-opposed surface to a position (diameter reduction position) at which the change rate of the width of the main magnetic pole piece in the direction of the track width from the medium-opposed surface, in the vertical direction of the element, varies at the pole tip of the main magnetic pole piece in order to concentrate magnetic fluxes at the pole tip of the main magnetic pole piece that is opposed to the medium and defines the track width. If the throat height is low, the magnetic field strength is correspondingly high and the distribution width thereof in the direction of the track width, is large. If the throat height is high, the magnetic field strength is correspondingly low and the distribution width thereof in the direction of the track width, is small. A low magnetic field strength makes it difficult to write onto media of large coercive force. If the distribution width in the direction of the track width is large, this poses the problem that data stored in adjacent tracks is erased.

In addition, to achieve a higher recording density, it is absolutely necessary to increase a track density and a linear recording density. To achieve the above, it is desirable to reduce the recording track width. For the reduction, a head having a side-shield structure, for example, is accordingly proposed. The gaps between the side shields and the main magnetic pole piece, that is, side gaps, and the film thickness of the side shields are important in the side-shield structure.

Dimensional tolerances for the throat height and for the side shields are very important and the nonuniformity of manufacturing dimensions, associated with these dimensional tolerances, must be suppressed for higher density. The nonuniformity of manufacturing dimensions deteriorates performance and reduces yield. For the throat height, the film thickness of the side shields, and the like, the causative factors of nonuniformity exist in not only wafer processes, but also a polishing process for the air-bearing surface.

For these reasons, minimizing the nonuniformity of the magnetic field strength and distribution is mandatory for improving the performance and manufacturing yield of the magnetic head. This problem must be solved to achieve even higher recording density in the magnetic disk drives that employ perpendicular magnetic recording.

BRIEF SUMMARY OF THE INVENTION

Embodiments in accordance with the present invention provide a perpendicular recording magnetic head whose dimensional dependency on the nonuniformity of magnetic field strength and distribution during manufacture is minimized, with narrowed tracks and without attenuation or erasure of adjacent track data while maintaining high magnetic field strength. According to the particular embodiments of FIGS. 1 and 2, a magnetic material (trailing/side shield) 32 and 33 for creating a steep gradient of magnetic field strength is provided at a trailing side of a pole tip 1B of a main magnetic pole piece 1 and in a direction of the track width. The magnetic head is formed so that a gap (side gap length "gl") between a side shield 33 and a throat height portion of the pole tip 1B progressively decreases with an increasing distance from an air-bearing surface, in a direction of an element height. That is, side gap length "gl" (2) at element height position P2 is made smaller than side gap length "gl" (1) at air-bearing surface position P1 so as to satisfy a relationship of gl(1)>gl(2).

BRIEF DESCRIPTION OF THE DRAWINGS

FIG. 14A is a top plan view showing a schematic configuration of a magnetic disk drive in which is mounted a perpendicular recording magnetic head according to embodiments of the present invention.

FIG. 14B is a schematic sectional view of the magnetic disk drive shown in FIG. 14A.

DETAILED DESCRIPTION OF THE INVENTION

Figure 1:
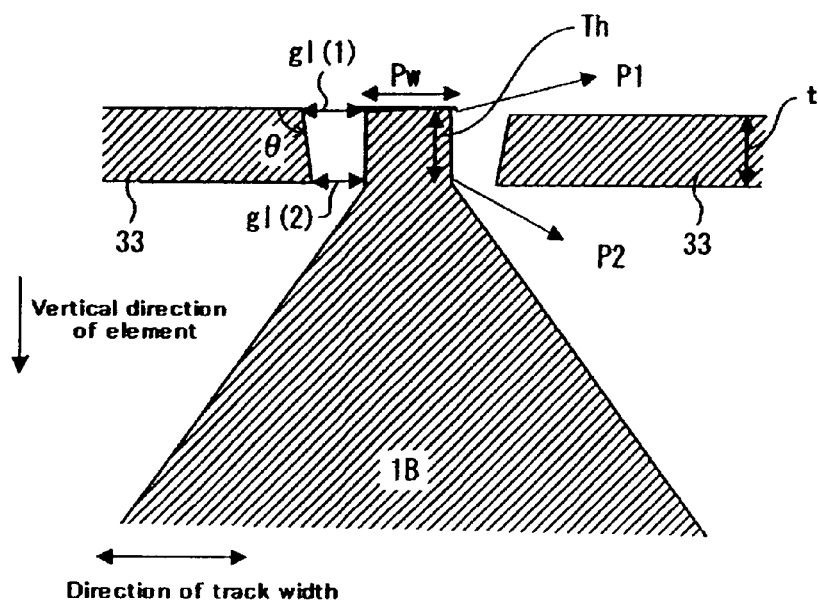
FIG. 1 is a schematic top view of a pole tip of a perpendicular recording magnetic head according to a first embodiment of the present invention, showing the pole tip when it is viewed from a direction of a trailing edge.

Embodiments in accordance with the present invention relate generally to perpendicular recording magnetic heads, and more particularly, to a perpendicular recording magnetic head with a main magnetic pole piece and an auxiliary magnetic pole piece.

An object of embodiments in accordance with the present invention is to provide a perpendicular recording magnetic head minimized in terms of dimensional dependence on non-uniformity of magnetic field strength and distribution during manufacture.

A perpendicular recording magnetic head according to embodiments of the present invention includes a main magnetic pole piece and an auxiliary magnetic pole piece. The main magnetic pole piece has a pole tip to define recording track width, and a yoke section receding from the pole tip in a vertical direction of an element. Further, the main magnetic pole piece has a magnetic material (trailing/side shield) formed for creating a steep gradient of magnetic field strength at a trailing side of the pole tip and in a direction of the track width. The main magnetic pole piece has a structure so that gaps (side gap length) between the main magnetic pole piece and the side shield is progressively reduced from an air-bearing surface in the vertical direction of the element.

The pole tip of the main magnetic pole piece has a width corresponding to the track width over a required distance from the air-bearing surface in the vertical direction of the element, and the side faces of the magnetic material that are opposed to both side faces of the pole tip are angled so that the higher the gap between both side faces of the pole tip is in the vertical direction of the element, the smaller the gap is.

Angles formed by the side faces of the magnetic material with respect to faces parallel to the direction of the track width each desirably range from a minimum of 104 degrees to a maximum of 130 degrees.

Also, the pole tip of the main magnetic pole piece may be formed to have a shape so that the width in the direction of the track width spreads in the vertical direction of the element. In addition, the magnetic material may be formed so that the side faces thereof that are opposed to both side faces of the pole tip are orthogonal to the faces parallel to the direction of the track width.

A spread angle of the pole tip of the main magnetic pole piece in the direction of the track width desirably range from a minimum of 104 degrees to a maximum of 130 degrees, with respect to the faces parallel to the direction of the track width.

According to embodiments of the present invention, since dependence of magnetic field strength and distribution upon throat height and side shield thickness can be reduced, it is possible to improve a manufacturing yield for the magnetic head while maintaining its performance.

Embodiments of the present invention are described hereunder with reference to the accompanying drawings. In the figures described below, the same reference number or code is assigned to the same functional section of the present invention.

FIG. 14A is a top view showing a schematic configuration of a magnetic disk drive in which a perpendicular recording magnetic head according to embodiments of the present invention is mounted. FIG. 14B is a sectional view of the magnetic disk drive. The magnetic disk drive activates the magnetic head mounted on a magnetic head slider 13 fixed to a front end of a suspension 12, and reads/writes a magnetizing signal at a required position on a magnetic disk (magnetic recording medium) 11 rotated by a motor 28. A position of the magnetic head in a radial direction of the magnetic disk (i.e., a track) can be selected by rotationally driving a rotary actuator 15. A writing signal to the magnetic head, and a readout signal from the magnetic head are processed by circuits such as a head amplifier 35a and a signal-processing circuit provided on a printed circuit board 35b.

Figure 2:
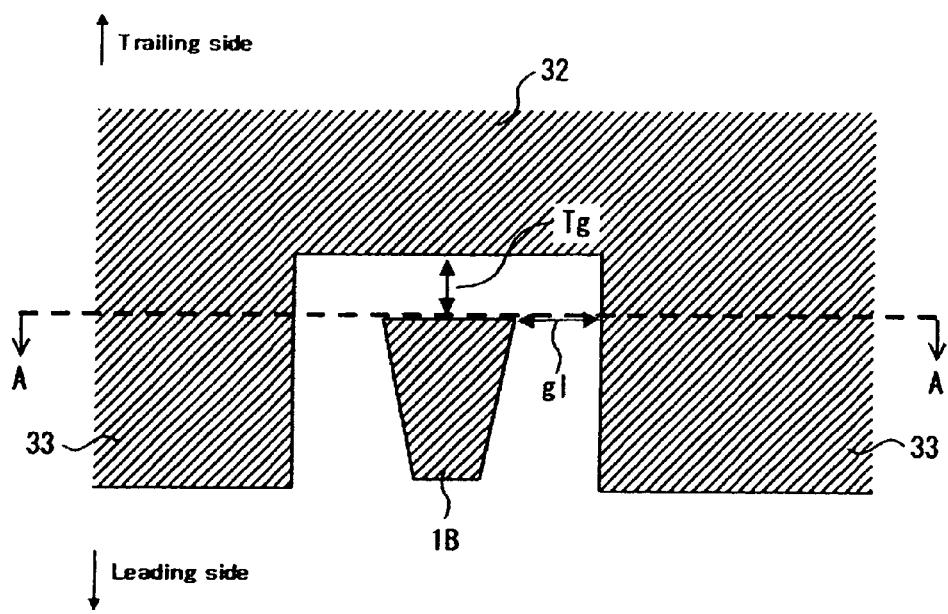
FIG. 2 is a schematic diagram of a neighboring section of the pole tip of the perpendicular recording magnetic head according to the first embodiment, showing the neighboring section when it is viewed from an air-bearing surface of the head.
Figure 3:
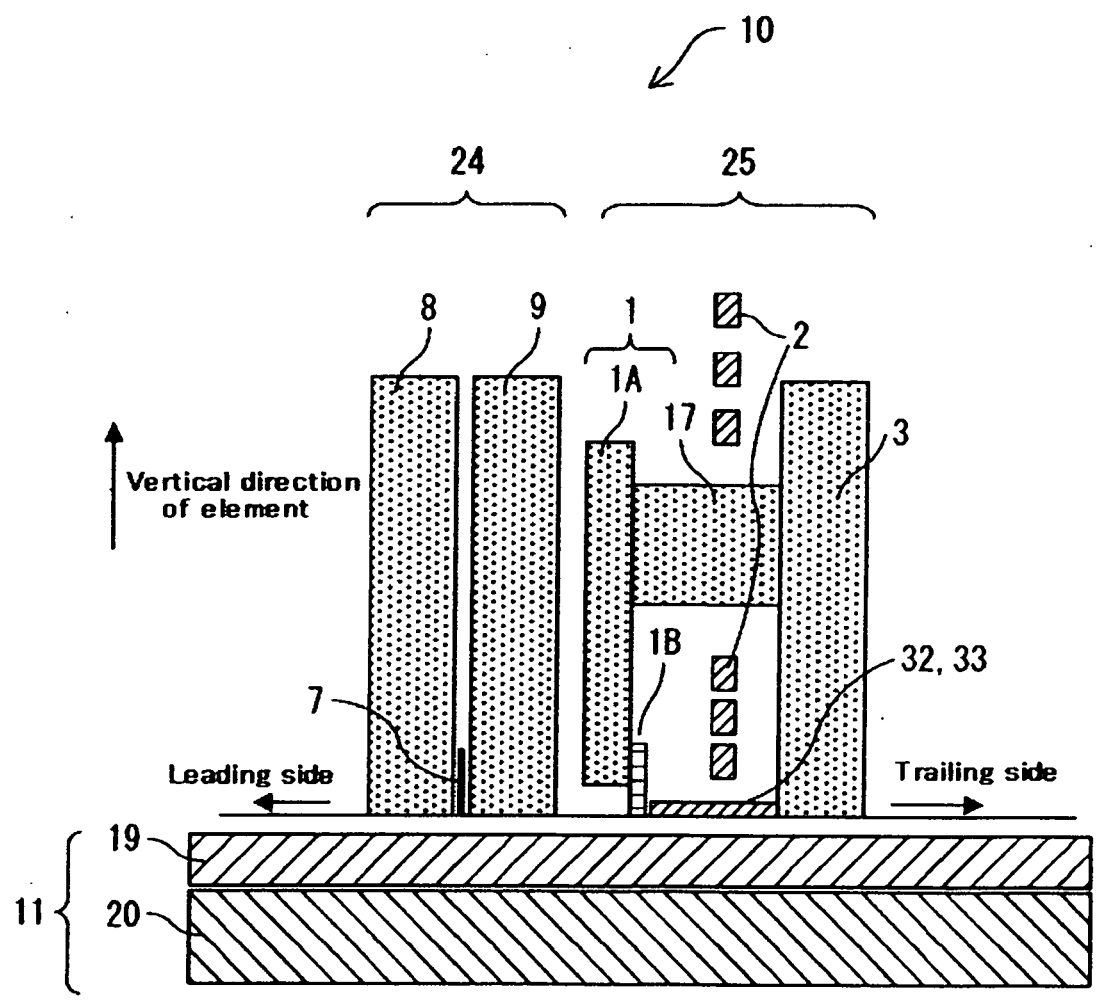
FIG. 3 is a schematic sectional view of the perpendicular recording magnetic head of the first embodiment, showing the magnetic head when it is positioned centrally above a track.

FIG. 1 is a schematic diagram of a pole tip of a main magnetic pole piece in a perpendicular recording magnetic head according to a first embodiment, showing the pole tip when it is viewed from a direction of a trailing edge. FIG. 2 is a schematic diagram of a neighboring section of the main magnetic pole piece, showing the neighboring section when it is viewed from an air-bearing surface of the head. FIG. 3 is a schematic sectional view of the perpendicular recording magnetic head of the first embodiment, positioned centrally above a track. Magnetic recording medium 11 is also shown in FIG. 3.

As shown in FIG. 3, perpendicular recording magnetic head 10 is a read/write composite head assembly formed of a writing head (single magnetic pole piece head) 25 including a main magnetic pole piece 1 and an auxiliary magnetic pole piece 3, and a reading head 24 including a reading element 7. The reading element 7 constituted by a giant magnetoresistive (GMR) element, a tunneling magnetoresistive (TMR) element, and the like, is disposed between one pair of magnetic shields (reading shields) formed of a leading-side lower shield and a trailing-side upper shield. The main magnetic pole piece 1 and the auxiliary magnetic pole piece 3 are magnetically interconnected by a pillar 17 at a position distant from the air-bearing surface. A thin-film conductor coil 2 is interlinked to a magnetic circuit composed by the main magnetic pole piece 1, the auxiliary magnetic pole piece 3, and the pillar 17. The main magnetic pole piece 1 is disposed at a leading side of the auxiliary magnetic pole piece 3. The main magnetic pole piece 1 is constituted by a main magnetic pole piece yoke 1A and a main magnetic pole piece pole tip (pole tip) 1B exposed to the air-bearing surface of the head to define track width.

Magnetic fluxes that have been generated from the main magnetic pole piece 1 of the writing head 25 form a magnetic flux path passing through a magnetic recording layer 19 and a backing magnetic layer 20 of the magnetic recording medium 11 and returning to the auxiliary magnetic pole piece 3. A magnetizing pattern is recorded on the magnetic recording layer 19. An intermediate layer may be formed between the magnetic recording layer 19 and the backing magnetic layer 20.

As shown in FIG. 1, the pole tip 1B has a portion at which a horizontal dimension (width) of the pole tip in a direction of the track width is reduced towards the air-bearing surface, and a portion of a fixed width corresponding to the track width Pw, the latter portion ranging from element height (throat height "Th") to air-bearing surface position P1. A shape of the pole tip 1B when viewed from the air-bearing surface is shown in FIG. 2. The shape of the pole tip 1B is an inverted trapezoidal shape in which the width of the pole tip in the direction of the track width is greater at a trailing side of the pole tip than at a leading side thereof. The track width Pw is defined by the width on the trailing side.

As shown in FIGS. 1 and 2, magnetic materials 32 and 33 disposed on the trailing side of the pole tip 1B and in the direction of the track width, are respectively a trailing shield 32 for absorbing the magnetic fluxes in a traveling direction of the head and increasing a magnetic field gradient in a magnetic field perpendicular components profile of the head, and a side shield 33 for reducing magnetic field leakage in the track width direction in order to achieve a narrower track.

Figure 4:
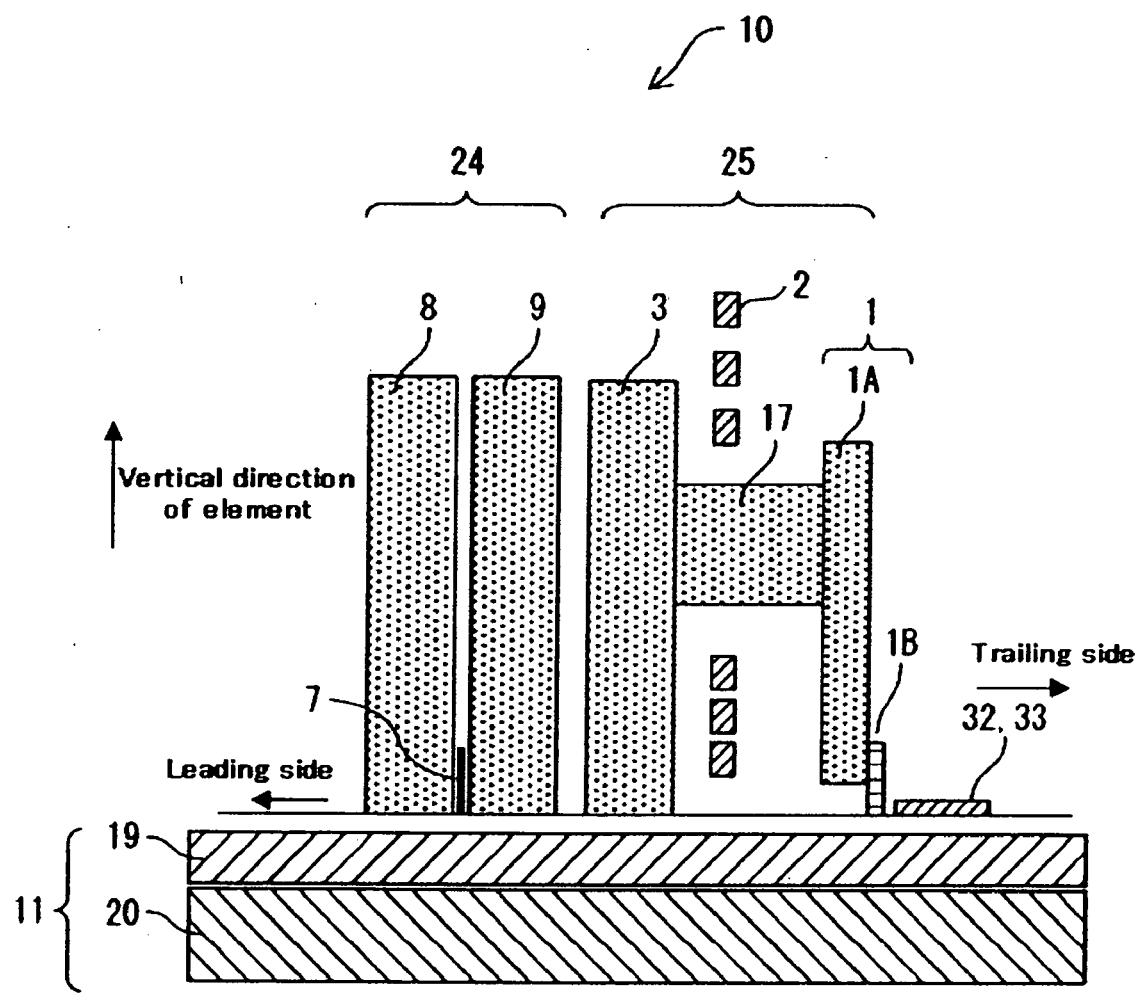
FIG. 4 is another schematic sectional view of the perpendicular recording magnetic head of the first embodiment, showing the magnetic head when it is positioned centrally above the track.
Figure 5:
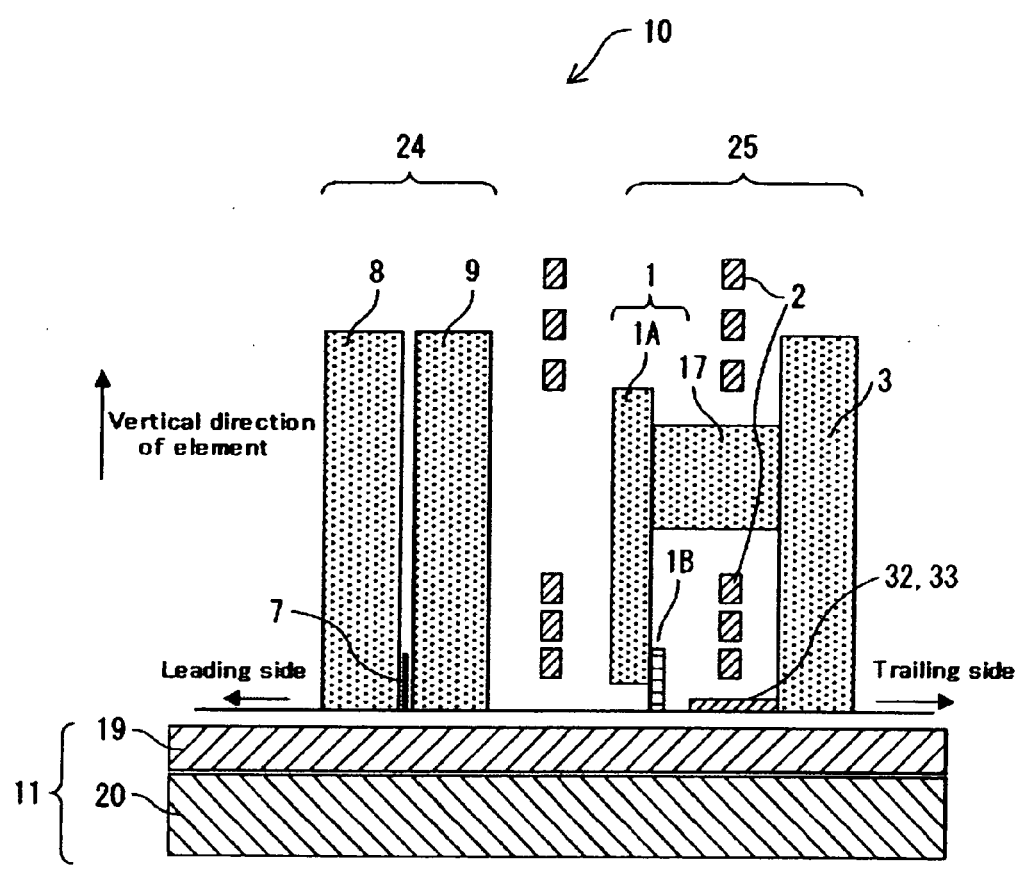
FIG. 5 is yet another schematic sectional view of the perpendicular recording magnetic head of the first embodiment, showing the magnetic head when it is positioned centrally above the track.
Figure 6:
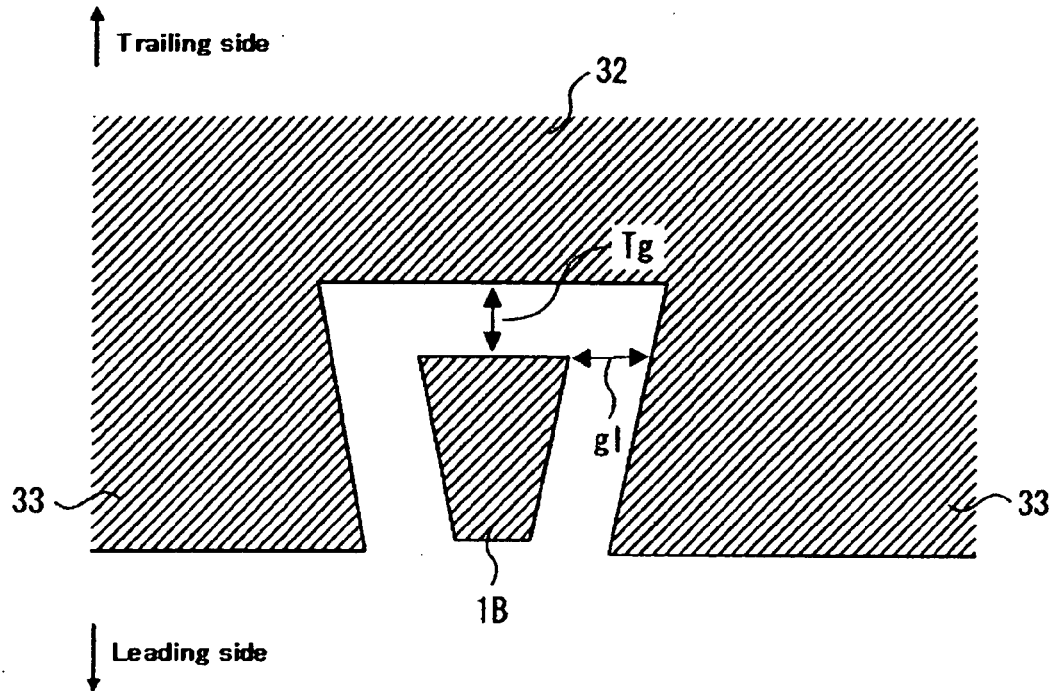
FIG. 6 is another schematic diagram of the neighboring section of the pole tip of the perpendicular recording magnetic head according to the first embodiment, showing the neighboring section when it is viewed from the air-bearing surface of the head.
Figure 7:
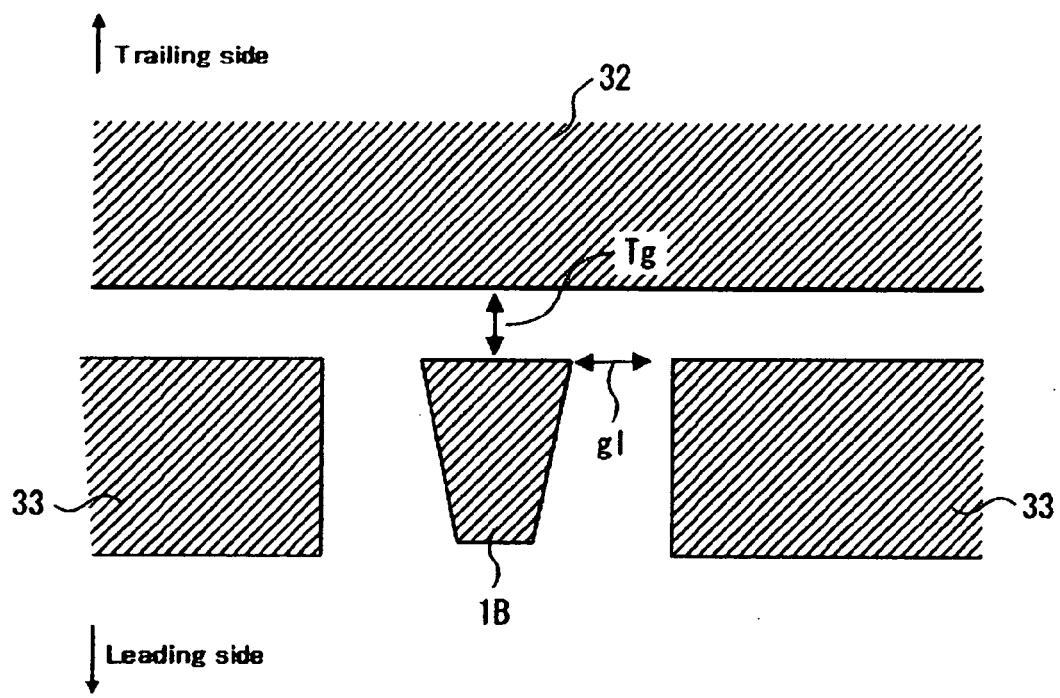
FIG. 7 is yet another schematic diagram of the neighboring section of the pole tip of the perpendicular recording magnetic head according to the first embodiment, showing the neighboring section when it is viewed from the air-bearing surface of the head.

Although the auxiliary magnetic pole piece 3 is disposed on the leading side of the main magnetic pole piece 1 in the head structure of FIG. 3, the auxiliary magnetic pole piece 3 may, as shown in FIG. 4, be disposed on the trailing side of the main magnetic pole piece 1. Also, as shown in FIG. 5, a coil may be disposed between the upper shield 9 and the main magnetic pole piece 1, or although not shown, a magnetic material may be disposed. In addition, the shape of the air-bearing surface may be such that as shown in FIG. 6, a side face of the side shield 33 (i.e., a face opposed to a side face of the pole tip) is inclined along the side face of the pole tip 1B having the inverted trapezoidal shape. Furthermore, the side shield 33 and the trailing shield 32 may be separate as shown in FIG. 7. Besides, only the side shield of the two shields may be formed to obtain greater magnetic field strength.

The magnetic head 10 of the present embodiment is formed such that as shown in FIG. 1, a gap (side gap length "gl") between the side shield 33 and the throat height portion of the pole tip 1B decreases from the air-bearing surface in the vertical direction of the element, that is, as the head moves away from the air-bearing surface. In other words, side gap length "gl" (2) at element height position P2 is made smaller than side gap length "gl" (1) at air-bearing surface position P1 so as to satisfy a relationship of gl (1)>gl (2).

A description is given below of three-dimensional magnetic field calculation results on the recording magnetic field generated by the main magnetic pole piece of the writing head 25 in the perpendicular recording magnetic head 10 of the first embodiment, and on the recording magnetic field generated by the main magnetic pole piece of the writing head of the conventional structure. The writing head of the conventional structure, used for the calculation, has a constant gap (side gap length "gl") between the pole tip of the main magnetic pole piece and the side shield. Calculation conditions are as shown below. The side gap length "gl" of the writing head 25 according to the first embodiment, shown in FIG. 1, is 100 nm at air-bearing surface position P1, and 25 nm at element height position P2. At this time, a skew angle θ from the side face of the side shield 33 that is parallel to the air-bearing surface is 127 degrees. The pole tip 1B is of the shape shown in FIG. 2, and has a film thickness of 200 nm and widths of 100 nm on the trailing side and 44 nm on the leading side. A gap (trailing gap "Tg") between the pole tip 1B and the trailing shield 32 is 40 nm.

The pole tip 1B uses CoNiFe as its material, and has a saturation magnetic flux density of 2.4 T and a relative magnetic permeability of 500. The yoke 1A of the main magnetic pole piece 1 uses 80 at % Ni-20 at % Fe whose saturation magnetic flux density is 1.0 T. The auxiliary magnetic pole piece 3 also uses 80 at % Ni-20 at % Fe whose saturation magnetic flux density is 1.0 T, and measures 30 μm in width (in the direction of the track width), 16 μm in length (in the vertical direction of the element), and 2 μm in film thickness. In addition, both the upper shield 9 and the lower shield 8 use 80 at % Ni-20 at % Fe whose saturation magnetic flux density is 1.0 T, and measure 32 μm in width (in the direction of the track width), 16 μm in length (in the vertical direction of the element), and 1.5 μm in film thickness. The trailing/side shield 32, 33 uses 45 at % Ni-55 at % Fe as its material, and has a saturation magnetic flux density of 1.7 T and a relative magnetic permeability of 1,000.

The backing soft magnetic layer 20 of the magnetic recording medium 11 is formed of CoTaZr, a distance from the air-bearing surface of the head to the backing soft magnetic layer 20 is 40 nm, and a film thickness thereof is 150 nm. Calculated strength of the recording magnetic field is based on a central position of the magnetic recording layer 19 that is 21 nm away from the air-bearing surface of the head. A selected recording current value is 35 mA, and a selected number of coil turns is 5.

In terms of shape and material, except for the side shield(s), selected calculation conditions relating to the writing head of the conventional structure with a constant magnitude of the side gap length are the same as those of the writing head of the first embodiment.

Figure 8:
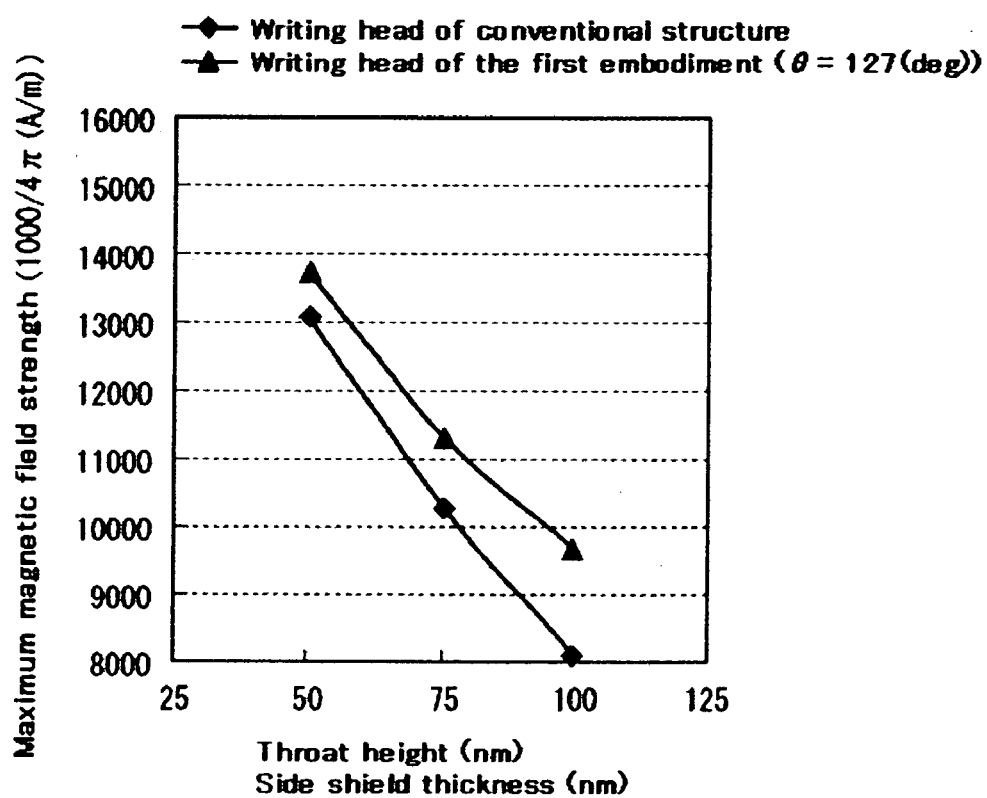
FIG. 8 is a diagram comparatively showing a writing head of a conventional structure and that of the first embodiment in terms of throat height/side shield thickness dependence of recording magnetic field strength.

Calculation results are shown in FIG. 8. FIG. 8 is a diagram in which maximum recording magnetic field strength data on the writing head 25 of the first embodiment and on the writing head of the conventional structure are plotted on a vertical axis and throat height "Th" and side shield thickness "t" are plotted on a horizontal axis. The calculations assume that the throat height "Th" and the side shield thickness "t" vary on the same dimensional basis. It can be seen from FIG. 8 that dependency of the structure according to the first embodiment on the throat height and the side shield thickness is low. For throat height and side shield thickness variations from 100 nm to 50 nm, the writing head of the conventional structure changes by 5,000 (×1,000/4π (A/m)) in magnetic field strength, whereas the writing head in the first embodiment changes only by 4,000 (×1,000/4π (A/m)), which is much smaller than the conventional structure. When the changes in the maximum magnetic field strength with respect to a throat height/side shield thickness variation of 75 nm are expressed in percentage terms, these changes are equivalent to 48% of the maximum magnetic field strength calculated for a throat height "Th" of 75 nm in the conventional structure. The change rate in the first embodiment, however, can be reduced to 36%. This is because the perpendicular recording magnetic head having a main magnetic pole piece and an auxiliary magnetic pole piece increases in magnetic field strength with decreases in the throat height "Th" of the main magnetic pole piece. Another reason is that the side-shielded structure maintains a relationship in which, as the side gap length decreases, a magnetic-flux absorbing capability of the side shield is augmented to narrow down the magnetic field distribution in the track width direction. Additionally, it is possible to suppress nonuniformity of the magnetic field strength and thus to suppress that of the magnetic field gradient at the same time.

Figure 9:
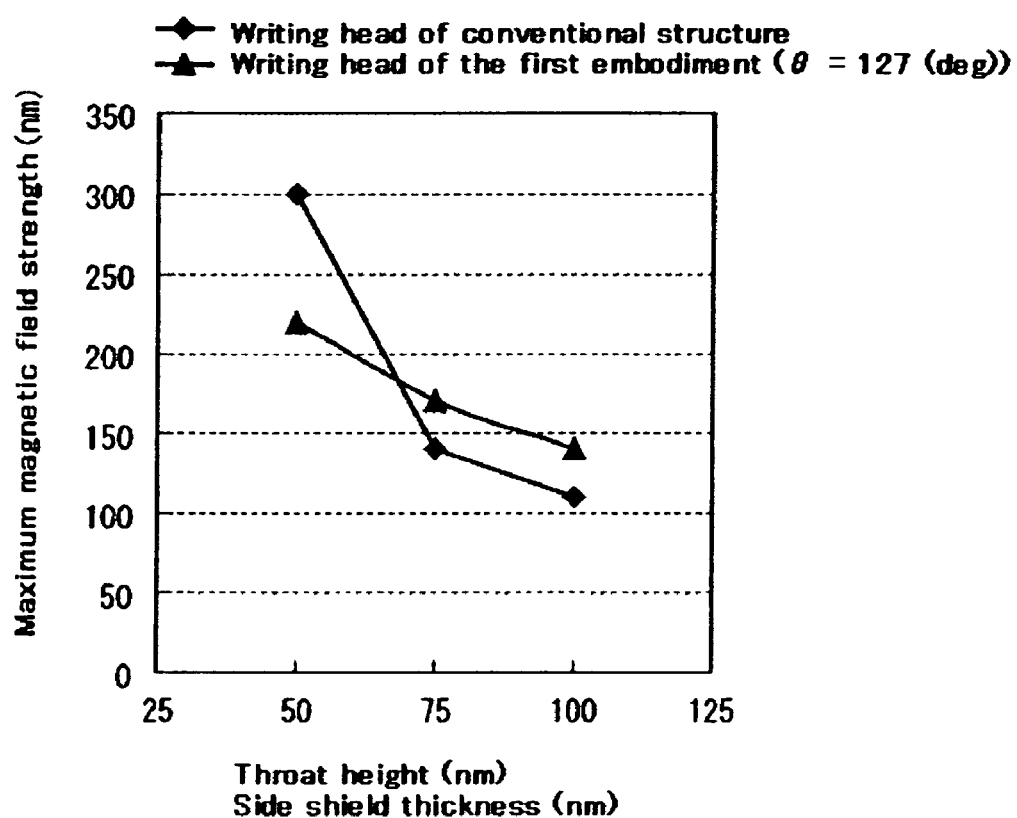
FIG. 9 is another diagram comparatively showing the writing head of the conventional structure and that of the first embodiment in terms of the throat height/side shield thickness dependence of the recording magnetic field strength.

Magnetic field distribution width in the track width direction is shown in FIG. 9. A horizontal axis in FIG. 9 denotes the throat height and the side shield thickness, and a vertical axis denotes the magnetic field distribution width at a coercive force of 5,000 (×1,000/4π (A/m)) of the medium, this magnetic field distribution width allowing for the fact that a signal is recorded on the medium. Whereas the magnetic field distribution width in the conventional structure differs by as much as 190 nm, the magnetic field distribution width in the structure of the present embodiment differs only by 80 nm. This indicates that the magnetic field distribution width can be suppressed below half of 190 nm.

As described above, since the nonuniformity of the magnetic field strength can be suppressed by using the writing head according to the first embodiment, this method makes it possible to suppress nonuniformity of overwriting characteristics and the like. Also, since the nonuniformity of the magnetic field gradient can be suppressed, the above method makes it possible to suppress nonuniformity of readout resolution and other characteristics. In addition, since nonuniformity of the magnetic field distribution in the track width direction can be suppressed, it is possible to suppress nonuniformity of effective track width. These features of the present embodiment make it possible to improve the magnetic head in terms of manufacturing yield while maintaining the performance of the head.

Figure 10:
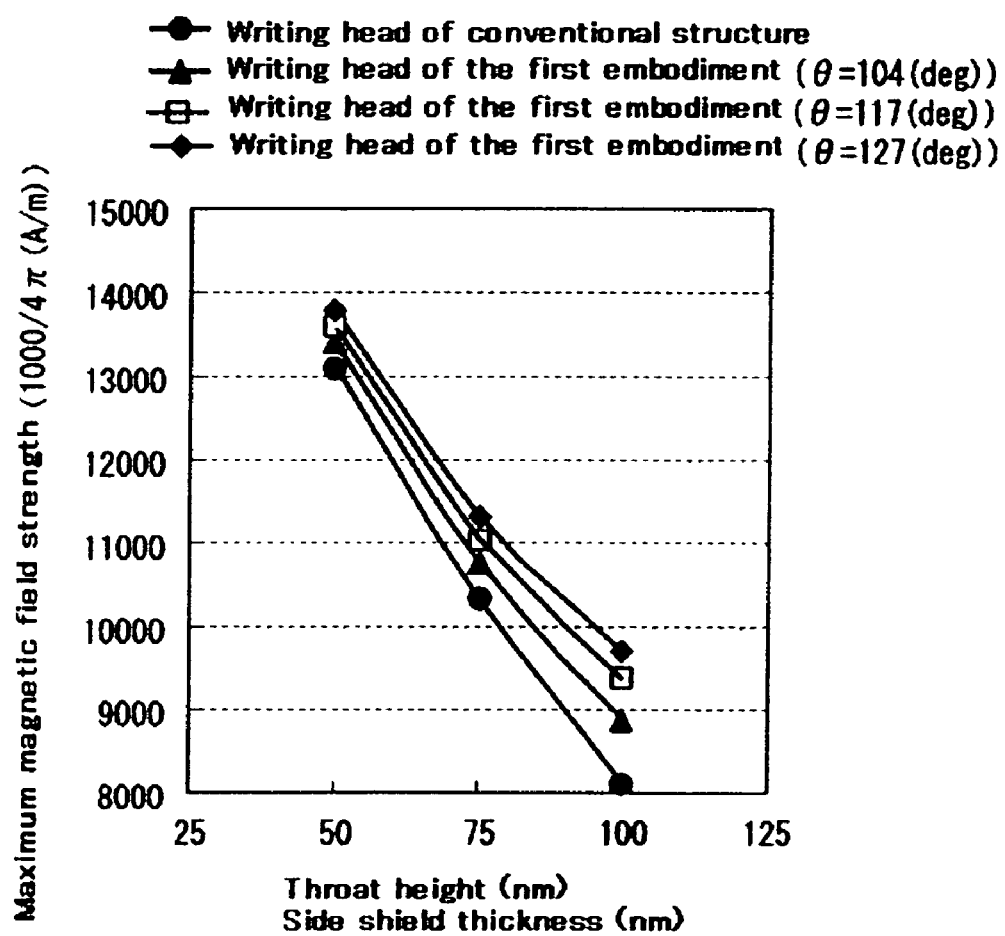
FIG. 10 is a diagram showing the throat height/side shield thickness dependence of the recording magnetic field strength of the writing head due to changes in an angle of the side shield.
Figure 11:
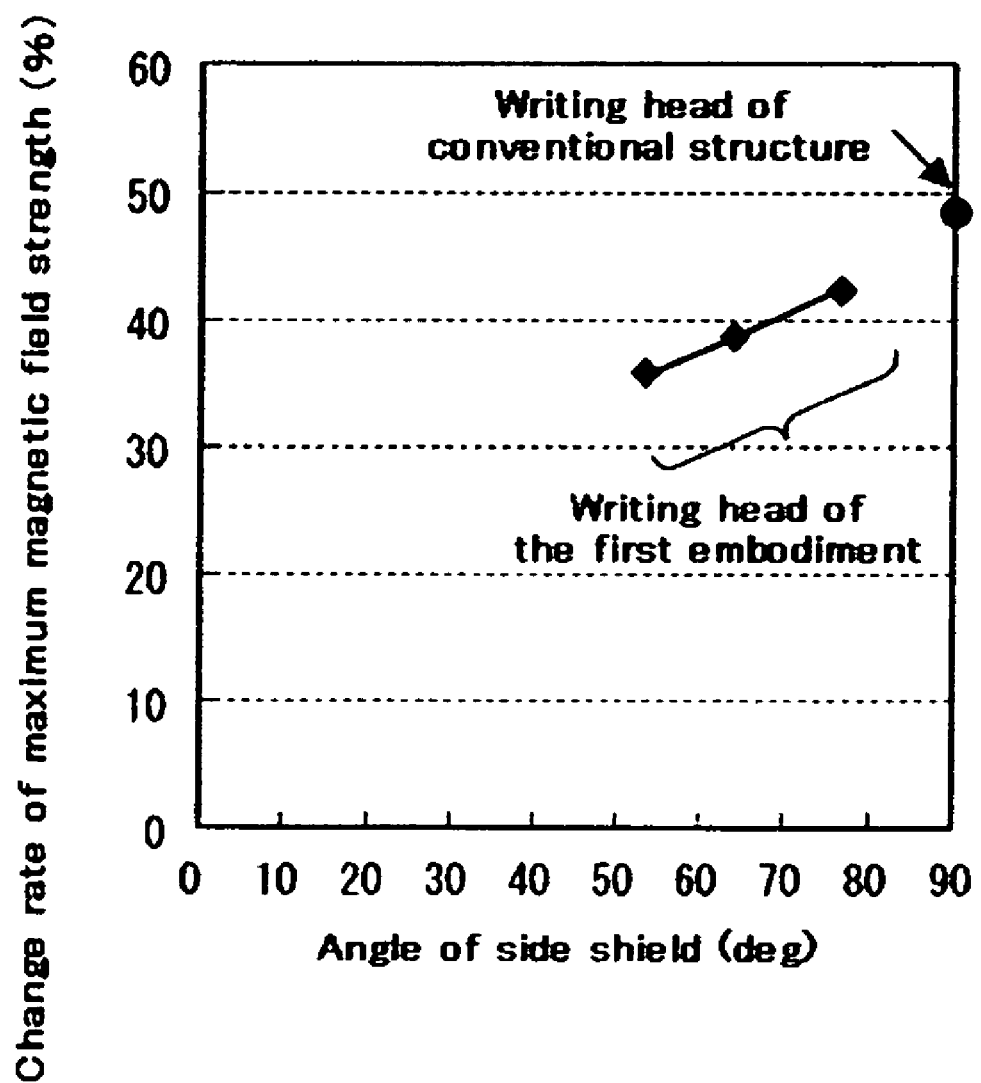
FIG. 11 is a diagram showing study results on how the magnetic filed strength changes in terms of rate at the maximum magnetic filed strength achievable for a throat height/side shield thickness of 75 nm.
Figure 12:
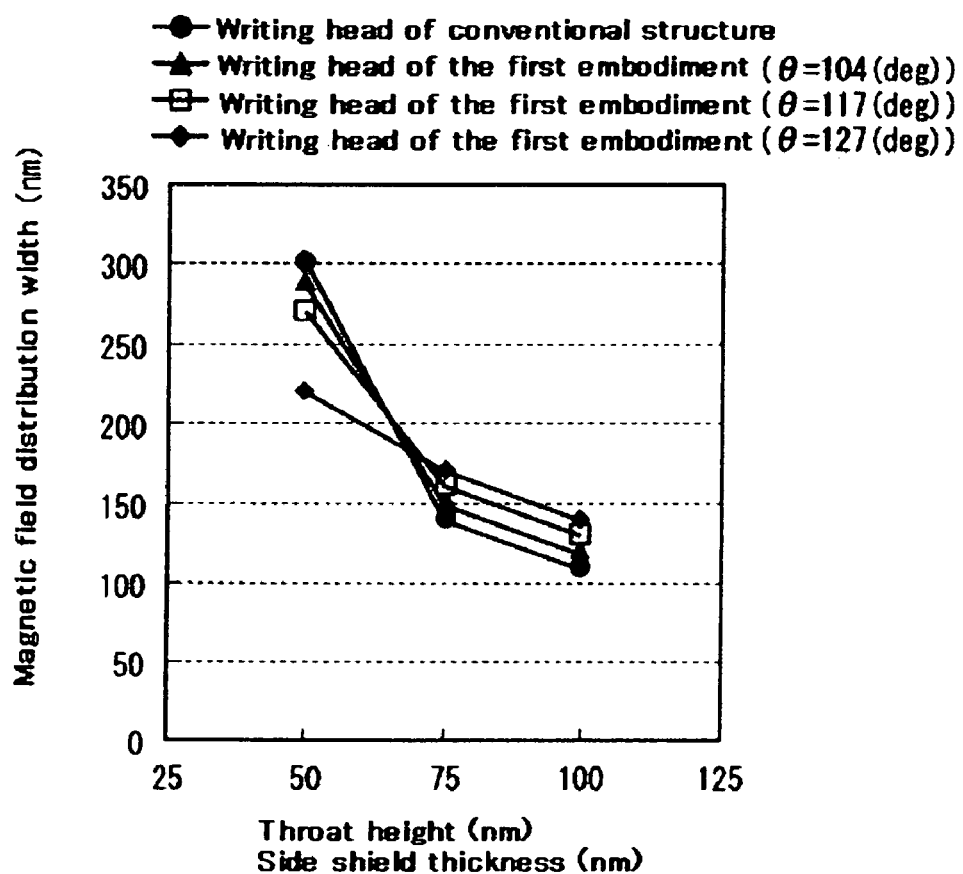
FIG. 12 is a diagram that shows magnetic field distribution width in a direction of the track width due to changes in the angle of the side shield.

FIG. 10 shows results on dependence of the maximum recording magnetic filed strength achievable by changing the angle θ of the side shield 33 in the above first embodiment. FIG. 11 shows the changes in magnetic field strength expressed in terms of rate at the maximum magnetic field strength achievable for a throat height/side shield thickness of 75 nm. FIG. 10 indicates that as the angle θ increases, the nonuniformity of the magnetic field strength decreases, and FIG. 11 indicates that the change rate of the maximum magnetic filed strength for the throat height/side shield thickness of 75 nm also decreases. FIG. 12 shows a change rate of the magnetic field distribution width in the track width direction according to the first embodiment with respect to changes in the angle θ of the side shield 33. It can be seen that the nonuniformity of the magnetic field distribution width is suppressed more significantly with increases in the angle θ. It is desirable that the angle θ be large. Increasing this angle too much, however, is not preferable since the side shield becomes less effective and thus the distribution of the magnetic field in the width direction deteriorates. Manufacturing the magnetic head in such a way as to obtain a large angle is difficult. In addition, formation of the magnetic material at an acute angle results in concentration of magnetic fluxes, which is not desirable. The angle θ, therefore, desirably ranges from 104 degrees to 127 degrees and is more desirably about 130 degrees, in particular.

While the calculations in the first embodiment assume that the throat height and the side shield thickness are the same in value, the trailing shield 32 and the side shield 33 may differ from each other in thickness. Study results on a case in which the thickness "t" of the side shield 33 is greater than the throat height "Th" are described below. The change rate of the magnetic filed strength in the conventional structure with respect to the maximum magnetic filed strength achievable for the throat height/side shield thickness of 75 nm is equivalent to 48%, whereas an actual change rate in the structure of the first embodiment is 40%.

While the first embodiment relates to the composite type of perpendicular recording magnetic head assembly having a writing head and a reading head, the present invention is not limited to/by this configuration and may be a perpendicular recording magnetic head assembly including only the writing head of the two heads.

Figure 13:
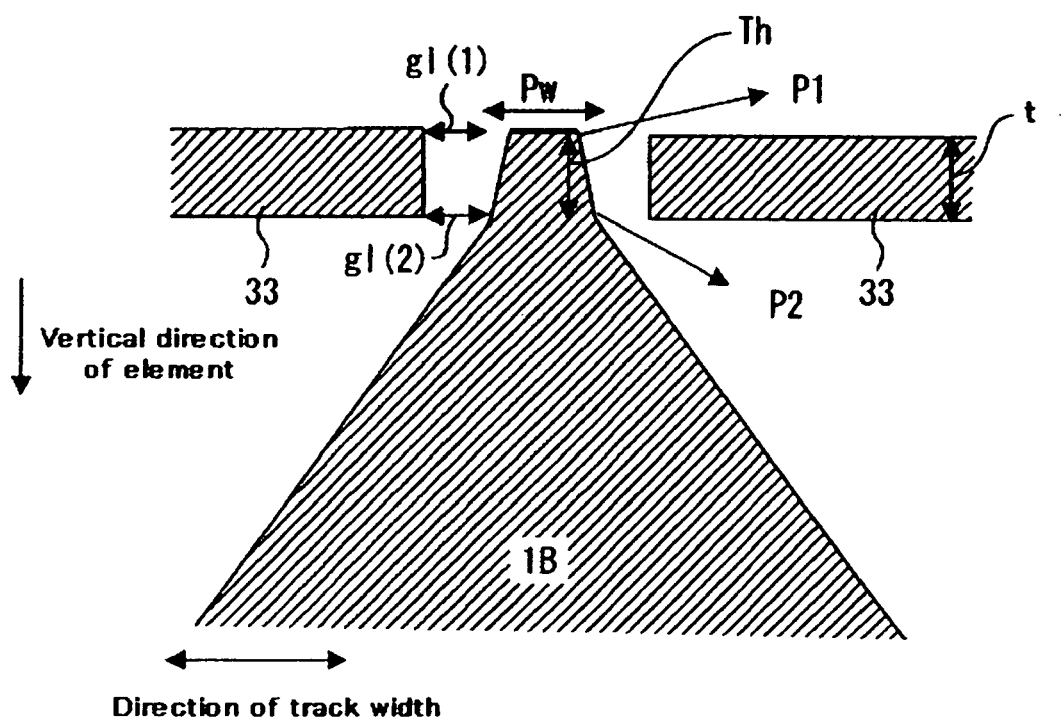
FIG. 13 is a schematic top view of a pole tip of a perpendicular recording magnetic head according to a second embodiment, showing the pole tip when it is viewed from a direction of a trailing edge.

A schematic plan view of a main magnetic pole piece of a perpendicular recording magnetic head according to a second embodiment of the present invention is shown as a structural example in FIG. 13, wherein the main magnetic pole piece when viewed from a trailing side is shown. All constituent elements, except the main magnetic pole piece, are the same as those of the first embodiment shown in FIGS. 3 to 5. Hereunder, therefore, only differences from the first embodiment are described. Width (geometric track width Pw) of a pole tip 1B of the main magnetic pole piece 1, exposed to an air-bearing surface, is smaller than width of the pole tip at diameter reduction position (element height) position P2 in a direction of track width. Also, a side gap length "gl" progressively decreases with an increasing distance from air-bearing surface position P1, in a direction of element height P2. That is, a relationship of gl(1)>gl(2) is established. In this structure, if throat height/side shield thickness is small, side gap length "gl" is also reduced to suppress a spread of a magnetic field in the direction of the track width. If the throat height/side shield thickness is large, since side gap length "gl" is increased above the former, the effect of suppressing the spread of the magnetic field in the direction of the track width is reduced. It is therefore possible to reduce throat height/side shield thickness dependence and thereby improve the magnetic head in terms of manufacturing yield while maintaining performance of the head.

What is claimed is:
1. A perpendicular recording magnetic head, comprising: a main magnetic pole piece with a pole tip which defines track width, wherein the pole tip has two side faces; an auxiliary magnetic pole piece; a coil interlinked to a magnetic circuit including the main magnetic pole piece and the auxiliary magnetic pole piece; and a magnetic material provided both on a trailing side of the main magnetic pole piece and in a direction of the track width; gaps between the magnetic material and both side faces of the pole tip of the main magnetic pole piece; wherein each of the gaps between the magnetic material and both side faces of the pole tip of the main magnetic pole piece progressively decreases with an increasing distance from an air-bearing surface.

2. The perpendicular recording magnetic head according to claim 1, wherein: the pole tip has a width corresponding to the track width over a required distance in a direction that the pole tip of the main magnetic pole piece moves away from the air-bearing surface; and side faces of the magnetic material that are opposed to both side faces of the pole tip are angled so that gaps with both side faces of the pole tip decrease with an increasing distance from the air-bearing surface.

3. The perpendicular recording magnetic head according to claim 2, wherein: angles formed by the side faces of the magnetic material with respect to faces parallel to the direction of the track width each range from a minimum of 104 degrees to a maximum of 130 degrees.

4. The perpendicular recording magnetic head according to claim 1, wherein: the pole tip of the main magnetic pole piece has a shape such that the width in the direction of the track width increases in the direction that the pole tip moves away from the air-bearing surface; and the side faces of the magnetic material that are opposed to both side faces of the pole tip are orthogonal to the faces parallel to the direction of the track width.

5. The perpendicular recording magnetic head according to claim 4, wherein: a spread angle of the pole tip of the main magnetic pole piece in the direction of the track width ranges from a minimum of 104 degrees to a maximum of 130 degrees, with respect to the faces parallel to the direction of the track width.

6. The perpendicular recording magnetic head according to claim 1, wherein: the magnetic material is of an integrated structure and has a gap with respect to the trailing side of the main magnetic pole piece.

7. The perpendicular recording magnetic head according to claim 1, further comprising a reading head provided adjacently to the main magnetic pole piece or the auxiliary magnetic pole piece.

* * * * *